May 7, 1957  A. D. ADAMS, JR  2,791,483
GALVANOMETER TRACE BLOCKER
Filed April 5, 1954
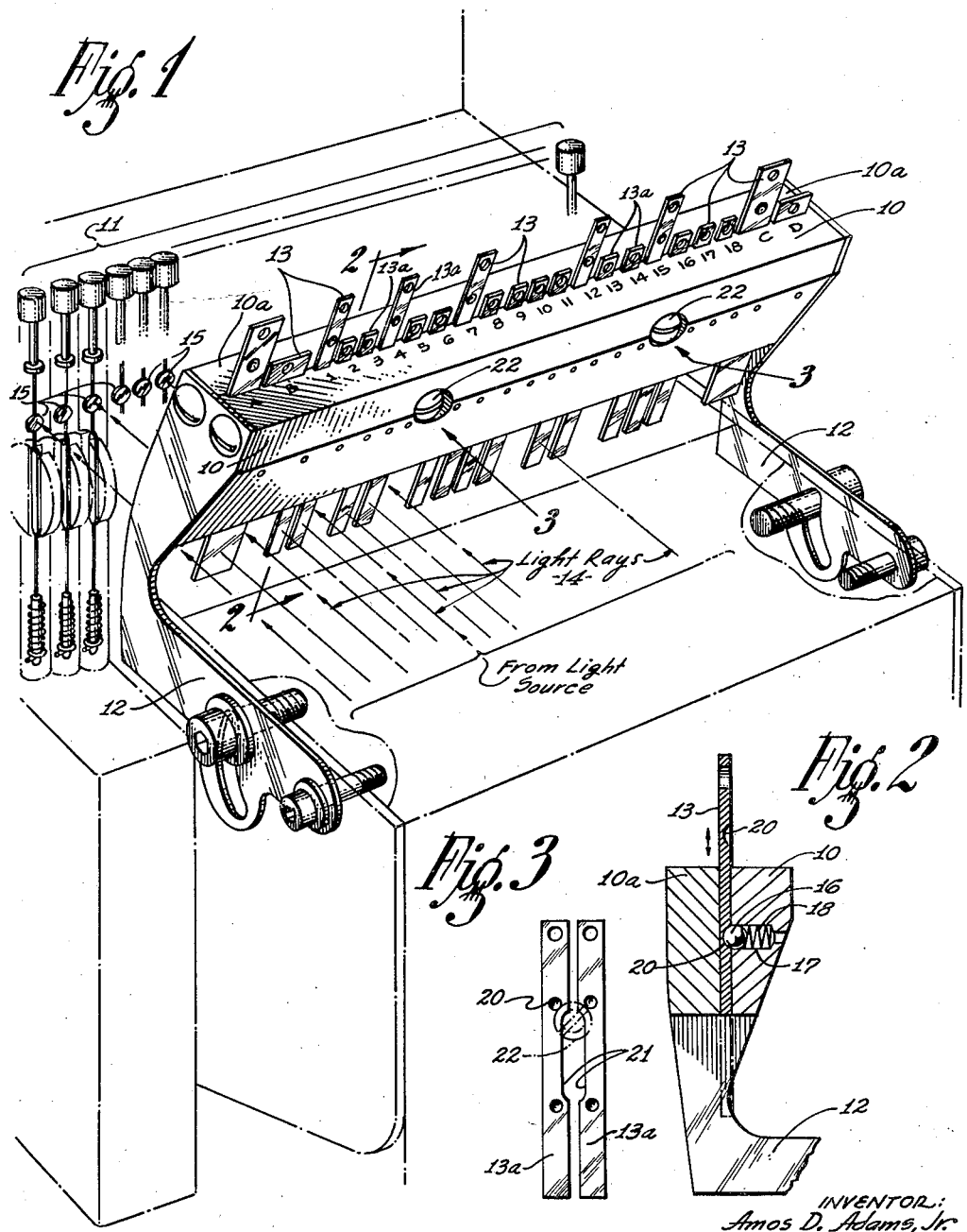
INVENTOR:
Amos D. Adams, Jr.
By Hubert E. Metcalf
His Patent Attorney

United States Patent Office 2,791,483
Patented May 7, 1957

2,791,483

GALVANOMETER TRACE BLOCKER

Amos D. Adams, Jr., Hawthorne, Calif., assignor to Northrop Aircraft, Inc., Hawthorne, Calif., a corporation of California Application April 5, 1954, Serial No. 420,907

2 Claims. (Cl. 346—145)

This invention relates to automatic multiple channel oscillographic apparatus for permanently recording data in graph form, and more particularly to a means of selectively blocking the recording of undesired galvanometer trace data from one or more channels.

The channel trace blocker is incorporated in a galvanometer recording oscillograph otherwise of usual construction which is arranged to record a plurality of strain gage, accelerometer or other readings made, for instance, during static or dynamic testing of an airplane.

The galvanometer recording instrument in which the instrument of the invention is incorporated comprises a casing having means on an outer wall for connecting the output leads from a plurality of strain gages, accelerometers or the like positioned on various parts of the airplane to record the behavior of as many components. A light source is arranged within the case and shines upon a row of galvanometers containing tiny mirrors mounted on miniature coils in a magnetic field, the current from a particular strain gage or accelerometer flowing through the coil and causing a deflection of the associated mirror to an amount depending on the value of the fluctuating current. The bank of mirrors throw individual beams of light on a sensitized tape to make a permanent record. When, as often happens, the readings of some channels are not required in certain tests, it is necessary to prevent the mirror concerned from directing a beam onto the sensitized tape, hitherto this is done by tilting the mirror mount in some way so that the reflected beam is off the sensitized film with consequent possibility of damage to the delicate instrument.

An object of the invention is to provide a simple and effective means for blocking selected light beams from undesired channels.

Another object of the invention is to preserve the accuracy for an interpretative analysis of the galvanometer light trace on the recording graph after the pre-test null reference and calibration has been made, by blocking the undesired light beam rather than removing, tilting or adjusting the galvanometer mirror from its calibrated position. Thus, a subsequent test run recording can accurately be made by unblocking the light beam.

Another object of the invention is that, since the galvanometer beam has not been disturbed since the pre-test calibration, an after test calibration can be accurately run for comparison.

Other more specific objects and features of the invention will appear from the disclosure of the following detailed description thereof, having reference to the accompanying drawings which illustrate and constitute a part of said disclosure.

In the drawings:

Figure 1 is a perspective view of the invention installed in one form of oscillographic recording apparatus.

Figure 2, taken along line 2—2 in Figure 1, is a cross-sectional view showing in detail another embodiment of the invention.

Figure 3 is a front view of two adjacent shutters, the location of the shutters when assembled being indicated by arrows 3 in Figure 1.

As is customary in an oscillographic recording instrument, a bank of galvanometers, equally spaced, are mounted across the rear of the instrument case and exposed to a light source at an angle. This invention is in the form of an attachable fixture mounted in front of the row of galvanometers with means provided to selectively block and unblock the recording of galvanometer trace data from one or more channels by interposing an adjustable shutter in the path of the light ray to the associated galvanometer.

Figure 1 shows a fitting, provided with shutter guide slots, in the form of a two piece bar 10 and 10a extended across a bank of galvanometers 11 and supported in position by detachable end brackets 12. Mounted for vertical adjustment in the two piece bar 10 and 10a are a plurality of shutters 13 in the form of metal strips interposed in the path of the light rays 14, and each aligned with a galvanometer mirror 15. When the strips 13 are in one position they obturate the light ray 14 to the associated mirror, and when in another, they do not affect the light beam.

In Figure 2 is shown a means to prevent the shutter 13 from being jarred out of adjusted position. Each strip 13 is provided with a detent in the form of a small ball 16 mounted in a small bore 17 with a spring 18 pressing the ball 16 against the strip 13. Holes or depressions 20 are provided in the strips 13 into which the guided balls 16 snap to hold the strips 13 firmly in one position or the other.

In Figure 3 is shown two adjacent shutters 13a that have been milled at cut-out 21 to allow clearance for assembly bolts 22 indicated by arrows 3 in Figure 1, to permit shutter movement.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a multiple channel recording instrument having a bank of galvanometers, means for selectively blocking light from one or more channels comprising: a member extending across the bank of galvanometers; a separate shutter for each galvanometer guided for rectilinear movement on said member; and mechanical means for releasably retaining each shutter at the end of its travel into operative and inoperative position.

2. A device as set forth in claim 1 and in which said member extending across the bank of galvanometers is provided with juxtaposed slots in each of which a shutter is mounted; and resilient means mounted on said member and acting directly against each shutter to engage with spaced formations on each of said shutters, said resilient means being operative to releasably retain said shutters at either end of their rectilinear movement.

References Cited in the file of this patent

UNITED STATES PATENTS

| | | |
|---|---|---|
| 2,251,998 | Goodale | Aug. 12, 1941 |
| 2,348,535 | Goodale | May 9, 1944 |
| 2,424,592 | Torwilliger | July 29, 1947 |
| 2,535,065 | Heiland | Dec. 26, 1950 |
| 2,652,755 | Higonnet et al. | Sept. 22, 1953 |